Sept. 14, 1937.　　　J. C. HEWITT, JR., ET AL　　　2,093,128
FILM TURNING MECHANISM
Original Filed Feb. 12, 1935
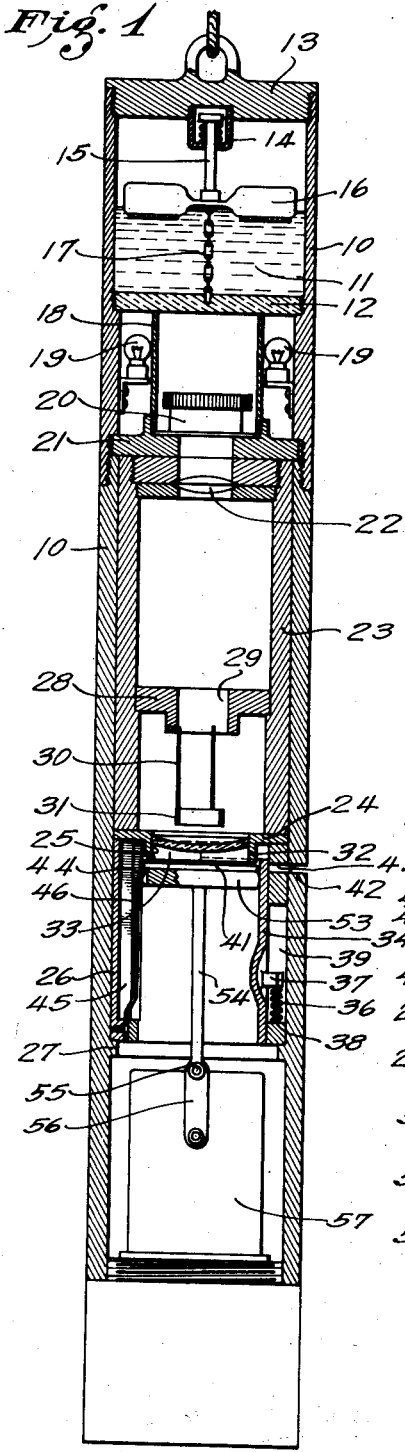
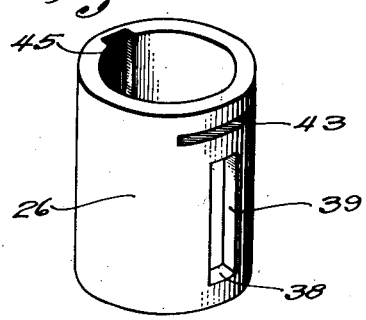
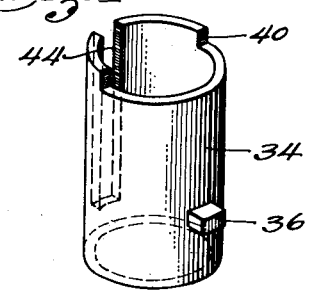
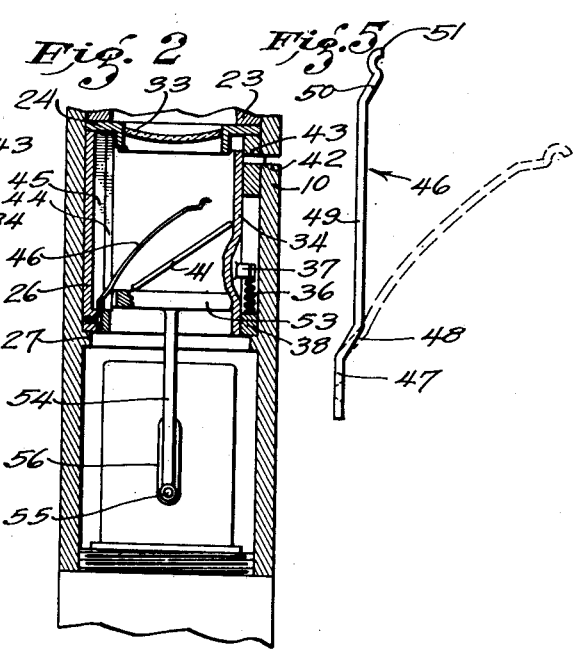
INVENTOR
JOHN C. HEWITT, JR.
V. EDWARD KUSTER
BY
James M. Abbott
ATTORNEY Patented Sept. 14, 1937

2,093,128

UNITED STATES PATENT OFFICE 2,093,128

FILM TURNING MECHANISM

John C. Hewitt, Jr. and Vivian Edward Kuster, Long Beach, Calif., assignors to Hewitt-Kuster Company, Long Beach, Calif., a co-partnership Application February 12, 1935, Serial No. 6,177
Renewed February 2, 1937

10 Claims. (Cl. 95—11)

This invention relates to photographic apparatus and particularly pertains to film turning mechanism.

In various instances where photographs are taken it is desirable to provide means permitting a sensitized photographic medium to be reversed without reloading the photographic device, and thus making it possible to make a photographic exposure on the opposite side of this medium. Such a device is particularly desirable for use in connection with apparatus for making soundings and measurements, as for example in oil well measuring instruments where it is necessary to lower a photographic device into the oil well and to thereafter photograph directional targets whereby the deviation of the drilled hole of the oil well may be ascertained as well as the direction of the deviation. It is the principal object of the present invention therefor to provide a photographic device which may be loaded with a film member having light sensitized surfaces upon its opposite sides and to thereafter optionally or automatically control mechanism whereby an image may be photographically exposed to the light sensitized surfaces in succession by reversing the film and presenting its opposite surface to exposure after a previous exposure has been made on the first presented surface of the film.

The present invention contemplates the provision of a camera unit adapted to be suitably connected with photographic instruments and which unit is designed to receive film sheets or plates of opaque character, and upon the opposite sides of which opaque member light sensitized emulsion is applied, the structure being provided with means for automatically turning the film between photographic exposures so that two exposures may be obtained on the opposite sides of one film.

The invention is illustrated by way of example in the accompanying drawing, in which:

Figure 1 is a view in central vertical section through a form of photographic apparatus embodying the present invention and suitable as a unit in an oil well surveying instrument.

Fig. 2 is an enlarged fragmentary view showing the film turning apparatus in the process of reversing the film.

Fig. 3 is a view in perspective showing the fixed sleeve of the film magazine.

Fig. 4 is a view in perspective showing the slidable sleeve of the film magazine.

Fig. 5 is a view in side elevation showing the spring.

Referring more particularly to the drawing, 10 indicates the outer cylindrical housing of the photographic unit with which the present invention is concerned. By way of example, this housing is shown as being fitted at its upper end with a liquid container 11 having a bottom wall 12 and a top wall 13. A suspending element 14 is carried concentrically of the top wall and yieldably supports a guide stem 15 from which a magnetic float 16 depends. This float rests upon a body of liquid within the liquid container 11 and is guided in its movement by a flexible element such as the chain 17. The chain is secured to the lower wall 12 of the member 11. The lower wall 12 has a central transparent section disposed over the upper end of a light tube 18. Illuminating elements such as lamps 19 are disposed within the housing 10 and illuminate the interior of the structure so that photographs may be taken of various element angles within the instrument. Disposed at the lower end of the light tube 18 within the housing 10 is a lens field piece 20 mounted upon a transverse partition wall 21 and through which light rays may be projected to and through a lens 22. The partition 21 extends transversely of the mouth of an inner housing sleeve 23 which abuts against an exposure plate 24 having a central flange opening 25 through it. A fixed magazine sleeve 26 is disposed within the housing 10 and abuts against the partition member 21. The lower end of this magazine sleeve rests upon an annular shoulder 27 formed as a part of the housing 10, or if desired detachably disposed within the housing 10. Thus when the partition member 21 is secured into place the fixed magazine sleeve 26, the flange partition member 25, and the inner housing member 23 will be rigidly held in their assembled positions. Disposed within the central bore of the member 23 and at a point intermediate the length thereof, is a transverse supporting web 28 formed with a central opening 29 in longitudinal alignment with the central axis of the instrument. Depending from the web 28 and extending in the direction of the partition 25 is a series of supporting wires 30 carrying a centering ring 31. This centering ring is of smaller diameter than the central opening through the partition member 25 and is disposed in the path of the light beam projected longitudinally of the instrument from the light tube 18. The partition member 25 is formed with a flange 32 which circumscribes the central opening 33 and extends downwardly and into the mouth of a sliding magazine sleeve 34. This magazine sleeve telescopes within the fixed magazine sleeve 26. The sliding sleeve is held normally in an abutting position against the face of the partition member 25 by an expansion spring 36 which is disposed between a lug 37 on the sliding sleeve 34 and a fixed shoulder 38 on the fixed sleeve. A longitudinally extending slot 39 is formed through the wall of the fixed magazine sleeve 26 and accommodates the moving lug 37 as well as provides the shoulder 38 upon which the spring 36 rests. By reference to Fig. 4 of the drawing it will be seen that the wall forming the mouth of the sleeve 34 is cut away for a distance substantially half of its diameter and for a depth slightly less than the length of the flange 32 on the partition member 25. This cutaway portion 40 is provided to permit the magazine to be loaded without removal from the housing 10 when the slidable magazine sleeve 34 is caused to telescope within the fixed magazine sleeve 26, and will at such a time permit a film disc 41 to be introduced into the magazine through a transverse slot 42 in the housing 10 and a slot 43 in register therewith in the fixed sleeve 26. As shown in Fig. 3 of the drawing the slot 43 which occurs in the fixed sleeve 26 is disposed adjacent the upper edge thereof and is here shown as occurring above the longitudinally slotted opening 39.

Formed in the slidable magazine sleeve 34 upon a diametrically opposite side from the cutaway portion 40 is a longitudinally extending slot 44 which extends substantially to the bottom of the slidable sleeve but does not completely sever the same. When the slidable and fixed magazine sleeves 34 and 26 are in their assembled positions with relation to each other the slot 44 will register with a longitudinal recess 45 formed in the inner wall of the fixed sleeve 26. Mounted within the recess is a film turning spring 46, the spring being so designed as to be flexed into a longitudinally extending position within the recess 45, and when pressure is relieved upon it to swing outwardly through the slotted opening 44 in the sliding magazine sleeve 34 and into and across the central passageway of the sliding sleeve 34. The lower end of the spring as indicated at 47 is fastened to the fixed sleeve 26 and lies flat between the fixed and slidable sleeves. At a point above the lower end of the slot 44 in the sliding sleeve 34 the spring is formed with a permanent offset portion 48 and then continues with a straight portion 49 which projects upwardly within the longitudinal slot 44 of the sliding sleeve. The upper end of the straight portion 49 is offset at 50 and terminates in a hook 51 which embraces a metal flange 52 of the film element 41. The film element 41 is here shown as made of some flat material, such as cardboard, upon the opposite sides of which a photographic emulsion is applied. The diameter of the film element including the metal binding 52 is substantially that of the inside diameter of the sliding sleeve 34. It is intended that during the time of taking a photograph the film element 41 shall be held firmly against the flange 32 of the partition member 35 and across the opening 33. A piston plate 53 is disposed within the sliding sleeve 34 and may reciprocate and rock therein. The edges of the piston disc 53 are curved so that rocking may take place. The disc is rigidly fastened at the end of a piston rod 54 which is pivotally connected to a pin 55 carried upon an operating crank 56 of a timing unit 57. The timing unit may be clock operated, or otherwise actuated so that the disc piston 53 may be reciprocated from the position shown in Fig. 1 to the position shown in Fig. 2, and then restored to its original position in reversing the film unit 41.

In operation of the present invention the device is loaded by passing a film unit 41 through the slotted openings 42 and 43 in the housing 10 and the fixed sleeve 26, and thereafter moving the unit to a proper position at the end of the piston disc 53 when the slidable sleeve 34 is moved downwardly to allow its wall to clear the slotted opening 43 at the point of the cutaway portion 40. When the slidable sleeve 34 is released it will move upwardly so that its wall will enter into the annular space between the flange 32 of the partition 25 and the circumscribing face of the fixed sleeve 26. The film will then be sealed against light exposure through the openings 42 and 43 and a picture may then be taken. At a proper time after the exposure the timing mechanism 57 will rotate the shaft of the crank 56 and will draw the piston rod 54 longitudinally of the structure, at the same time rocking the piston. The spring 46 will then tend to swing inwardly to the position shown in Fig. 2 of the drawing and will cause the film unit 41 to be reversed in this operation. The film unit will then fall beneath the spring 46 as it turns over and will lie flat upon the piston disc 53. When the timing unit 57 operates the crank shaft 56 it will force the piston upwardly engaging the inclined and offset portion 48 of the spring 46 and will force the spring 46 upwardly and outwardly into the slotted opening 44 of the sliding sleeve 34. When the piston reaches its uppermost position the film unit 41 will snap into the hooked end 51 of the spring 46 and will be firmly held in its temporary position preparatory to a subsequent exposure.

It will thus be seen that the structure here disclosed is composed of a few parts of simple construction and operation which make it possible to easily and effectively present a film member for photographic exposure and to reverse the same film member for exposure upon its opposite side without removal from the photographic unit.

While we have shown the preferred form of our invention, as now known to us, it will be understood that various changes might be made in the combination, construction, and arrangement of parts, by those skilled in the art, without departing from the spirit of the invention as claimed.

Having thus described our invention, what we claim and desire to secure by Letters Patent is:

1. In a photographic device, a member having a film exposure opening therein, a photographic element adapted to be supported thereacross, said element being characterized as having a light sensitized emulsion at its opposite sides, a holder for said photographic element and means acting to reverse said photographic element within the holder to successively present its opposite sides for photographic exposure.

2. In a photographic device having a light opening creating a photographic field, a magazine for receiving a photographic element and disposing the same across said opening, said element being characterized as having inherent rigidity, and carrying sensitized photographic members at its opposite sides, and means within the magazine for holding the photographic element in position and for reversing the same with relation to the magazine to permit photographic exposures to be made on its opposite faces.

3. A photographic device comprising a magazine, an exposure plate having a light opening therein, a slidable magazine cylinder longitudinally movable within the magazine, said magazine having a transverse opening in its side wall through which a flat rigid photographic element may be introduced into the magazine, a magazine sleeve having a passageway to permit the photographed element to pass into the sleeve, a longitudinally movable member within the magazine sleeve for holding the photographic element in position for exposure through the light opening at the end thereof, spring means cooperating therewith, and means for moving the holding element whereby the photographic element will be reversed and its opposite side presented to the light opening.

4. A photographic instrument comprising a tubular housing, a lens set therein, a frame within the housing defining a photographic field, a film magazine within the housing and adjacent said frame, a movable member adapted to hold a film plate in position with relation to said frame, means for actuating said movable member to move it toward and away from its holding position, and spring means cooperating therewith to hold the film plate in a position for photographic exposure and to cooperate with the moving member to reverse the film plate and to present its opposite side for photographic exposure after the operation.

5. A photographic instrument comprising a tubular housing, a lens set therein, a frame within the housing defining a photographic field, a film magazine within the housing and adjacent said frame, a movable member adapted to hold a film plate in position with relation to said frame, means for actuating said movable member to move it toward and away from its holding position, and spring means cooperating therewith to hold the film plate in a position for photographic exposure and to cooperate with the moving member to reverse the film plate and to present its opposite side for photographic exposure after the operation, the housing being formed with a slotted opening to permit the film plate to be introduced into the photographic instrument, and a slidable sleeve adapted to be moved to and from an obstructing position with relation to said slotted opening and to prevent a leakage of light into the photographic instrument when in its obstructing position.

6. A device of the character described comprising a tubular housing, a photographic lens disposed therein and adapted to project a light beam longitudinally of the housing, a partition member disposed transversely of the housing and formed with an opening therein to define an exposure field across which a photographic element may be placed, a tubular magazine extending longitudinally within the housing and having its end opening in register with the photographic field, a tubular sleeve slidable within said magazine sleeve, said housing and magazine sleeve formed with a transverse opening through which a photographic element may be introduced into the device, said opening being normally closed by the sliding sleeve, and yieldable means for holding said slidable sleeve in its closed position.

7. A device of the character described comprising a tubular housing, a photographic lens disposed therein and adapted to project a light beam longitudinally of the housing, a partition member disposed transversely of the housing and formed with an opening therein to define an exposure field across which a photographic element may be placed, a tubular magazine extending longitudinally within the housing and having its end opening in register with the photographic field, a tubular sleeve slidable within said magazine sleeve, said housing and magazine sleeve formed with a transverse opening through which a photographic element may be introduced into the device, said opening being normally closed by the sliding sleeve, yieldable means for holding said slidable sleeve in its closed position, and a moving member adapted to hold the photographic element in a position for exposure to light from the photographic lens through the photographic field opening.

8. A device of the character described comprising a tubular housing, a photographic lens disposed therein and adapted to project a light beam longitudinally of the housing, a partition member disposed transversely of the housing and formed with an opening therein to define an exposure field across which a photographic element may be placed, a tubular magazine extending longitudinally within the housing and having its end opening in register with the photographic field, a tubular sleeve slidable within said magazine sleeve, said housing and magazine sleeve formed with a transverse opening through which a photographic element may be introduced into the device, said opening being normally closed by the sliding sleeve, yieldable means for holding said slidable sleeve in its closed position, a moving member adapted to hold the photographic element in a position for exposure to light from the photographic lens through the photographic field opening, and actuating means for said movable member.

9. A device of the character described comprising a tubular housing, a photographic lens disposed therein and adapted to project a light beam longitudinally of the housing, a partition member disposed transversely of the housing and formed with an opening therein to define an exposure field across which a photographic element may be placed, a tubular magazine extending longitudinally within the housing and having its end opening in register with the photographic field, a tubular sleeve slidable within said magazine sleeve, said housing and magazine sleeve formed with a transverse opening through which a photographic element may be introduced into the device, said opening being normally closed by the sliding sleeve, yieldable means for holding said slidable sleeve in its closed position, a moving member adapted to hold the photographic element in a position for exposure to light from the photographic lens through the photographic field opening, actuating means for said movable member, and means cooperating with said member whereby the photographic element will be reversed as the member moves away from and toward its holding position with relation to said photographic element.

10. In a photographic device having an element provided with a light opening creating a photographic field, a magazine for receiving a photographic element and disposing the same across the said opening, a longitudinally movable member within said magazine, a spring means in cooperation with the longitudinally movable member to automatically reverse the photographic element.

JOHN C. HEWITT, Jr.
V. EDWARD KUSTER.